(12) United States Patent
Heid

(10) Patent No.: US 6,588,716 B1
(45) Date of Patent: Jul. 8, 2003

(54) ACCESSORY MOUNT FOR AN EXTENDABLE SHAFT

(75) Inventor: Barry T. Heid, Yakima, WA (US)

(73) Assignee: Manhasset Specialty Co., Yakima, WA (US)

( * ) Notice: Subject to any disclaimer, the term of this patent is extended or adjusted under 35 U.S.C. 154(b) by 0 days.

(21) Appl. No.: 09/706,506

(22) Filed: Nov. 2, 2000

(51) Int. Cl.[7] .............................. A47F 5/00; F16M 11/00
(52) U.S. Cl. ..................... 248/125.8; 248/161; 248/157
(58) Field of Search ....................... 248/122.1, 125.8, 248/227.3, 230.7, 441.1, 447.2, 311.2, 161, 410, 157; 211/85.6, 205; 52/736.2

(56) References Cited

U.S. PATENT DOCUMENTS

| | | | | |
|---|---|---|---|---|
| 1,045,583 A | * | 11/1912 | Mills | 211/85.6 |
| 1,464,279 A | * | 8/1923 | Hindley | 248/125.1 |
| 1,570,168 A | * | 1/1926 | Mortensen | 248/124.1 |
| D127,562 S | | 6/1941 | Cloutier | 6/418 |
| 2,901,860 A | * | 9/1959 | Crawford | 211/85.6 |
| D276,779 S | | 12/1984 | Gomez | D6/418 |
| 4,611,722 A | * | 9/1986 | Teig | 211/107 |
| 4,673,153 A | | 6/1987 | Hilty et al. | 248/231.81 |
| 4,759,252 A | | 7/1988 | Occhipinti | 84/387 A |
| 4,821,988 A | | 4/1989 | Jimenez | 248/227.3 |
| D312,008 S | | 11/1990 | Speed et al. | D6/418 |
| 5,488,890 A | | 2/1996 | Biasini | 84/280 |
| 5,544,560 A | * | 8/1996 | Biasini | 84/387 A |
| 5,785,290 A | | 7/1998 | Harris | 248/311.2 |
| 5,833,192 A | | 11/1998 | Buhrman | 248/295.11 |
| 6,123,206 A | * | 9/2000 | Zaremba | 211/107 |
| 6,318,572 B1 | * | 11/2001 | Lai | 211/196 |

* cited by examiner

Primary Examiner—Leslie A. Braun
Assistant Examiner—A. Joseph Wujciak
(74) Attorney, Agent, or Firm—Stratton Ballew PLLC

(57) ABSTRACT

An accessory mount for removably securing an accessory to an extendable shaft, such as a music stand shaft The extendable shaft includes a stationary shaft and a telescoping shaft. The accessory mount includes a sleeve with a longitudinal opening, the sleeve being receivable on the extendable shaft. A collar provided proximate the upper edge of the interior surface of the sleeve supports the accessory mount on the stationary shaft of the extendable shaft, and prevents the accessory mount from sliding down the extendable shaft. An accessory attachment point on the sleeve is adapted to receive a variety of accessories. The accessories can include string instrument holders, mute holders, accessory trays and the like, which can be interchangeably mountable on the sleeve. The accessory mount is quickly and easily installed on an extendable shaft, and can be installed without tools or adjustments.

14 Claims, 13 Drawing Sheets

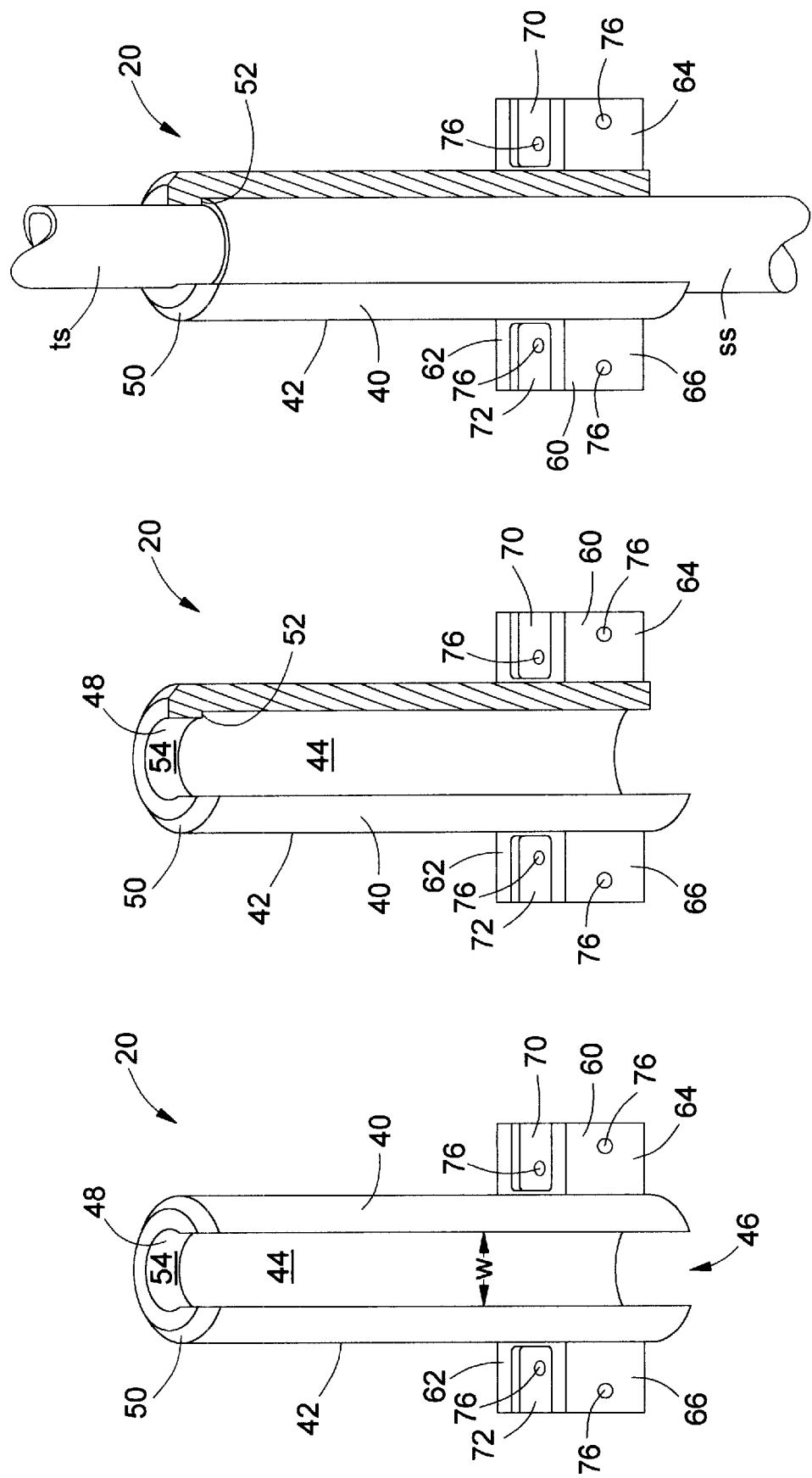

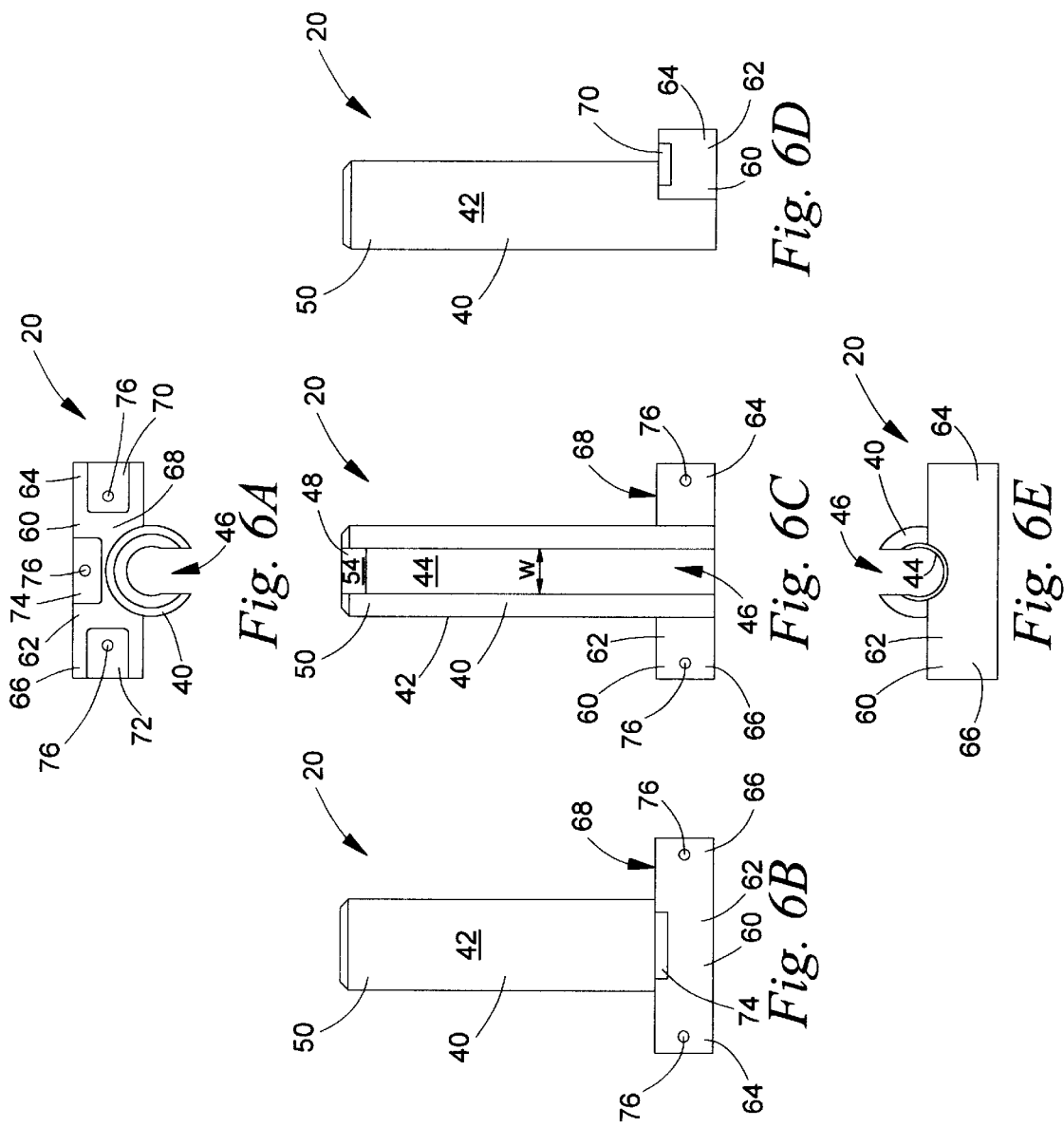

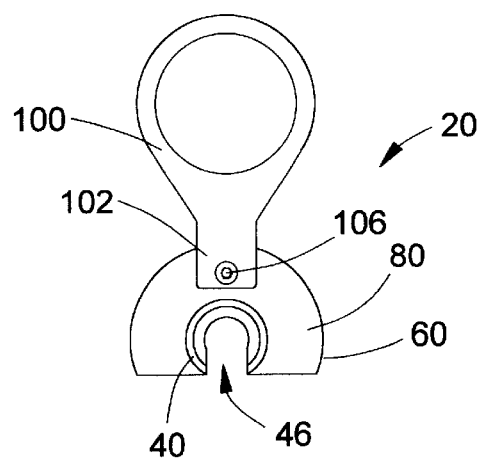
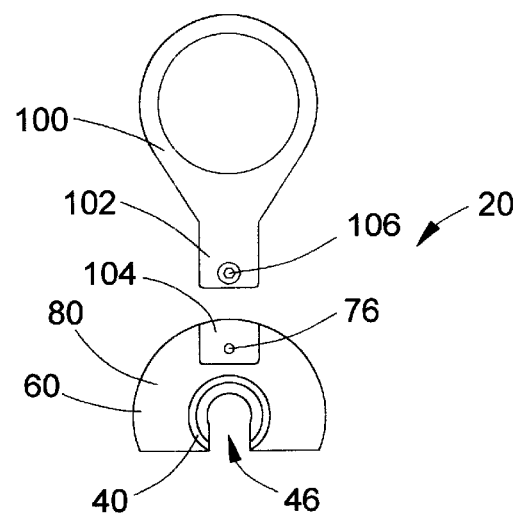
*Fig. 14A*  *Fig. 14B*

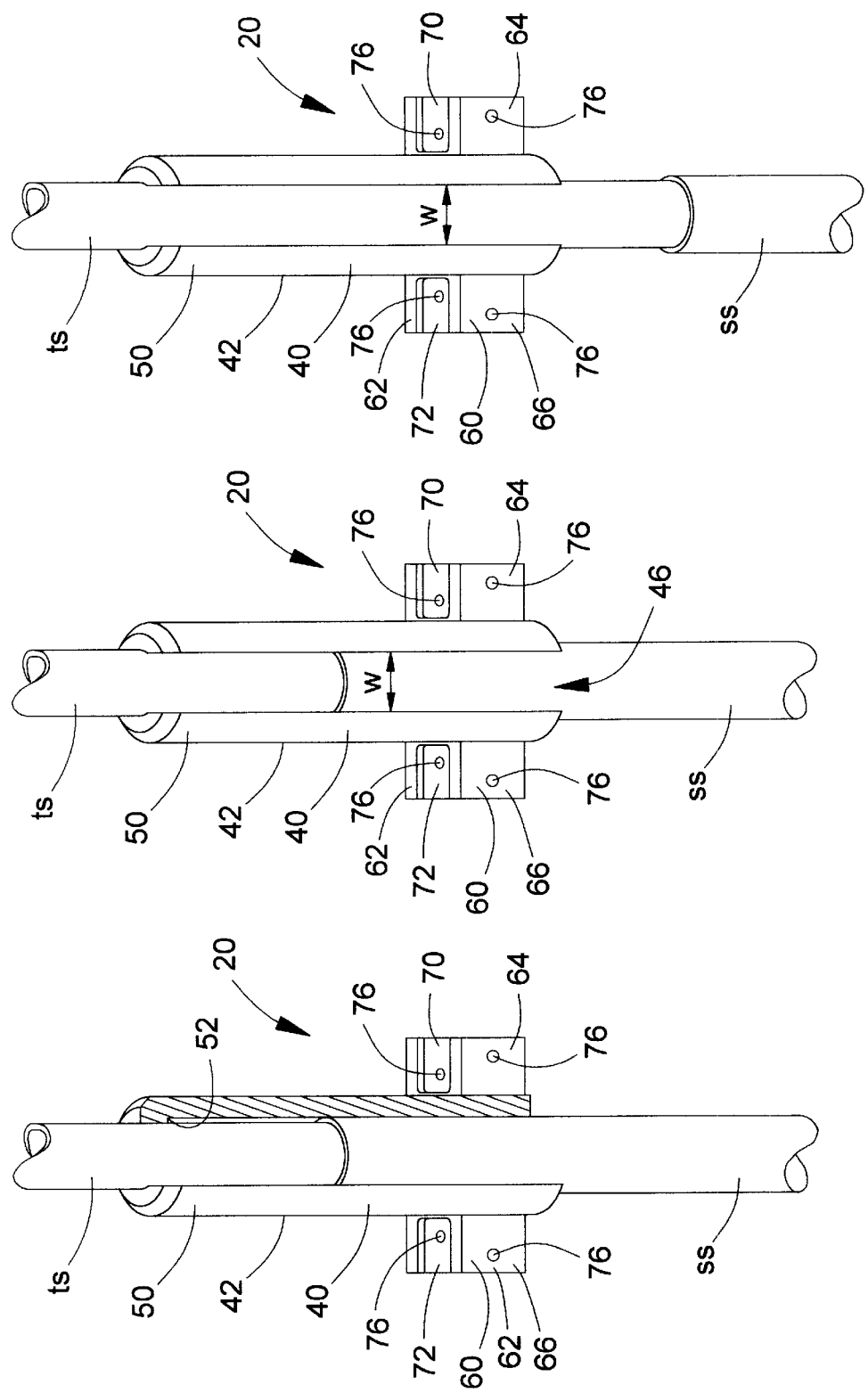

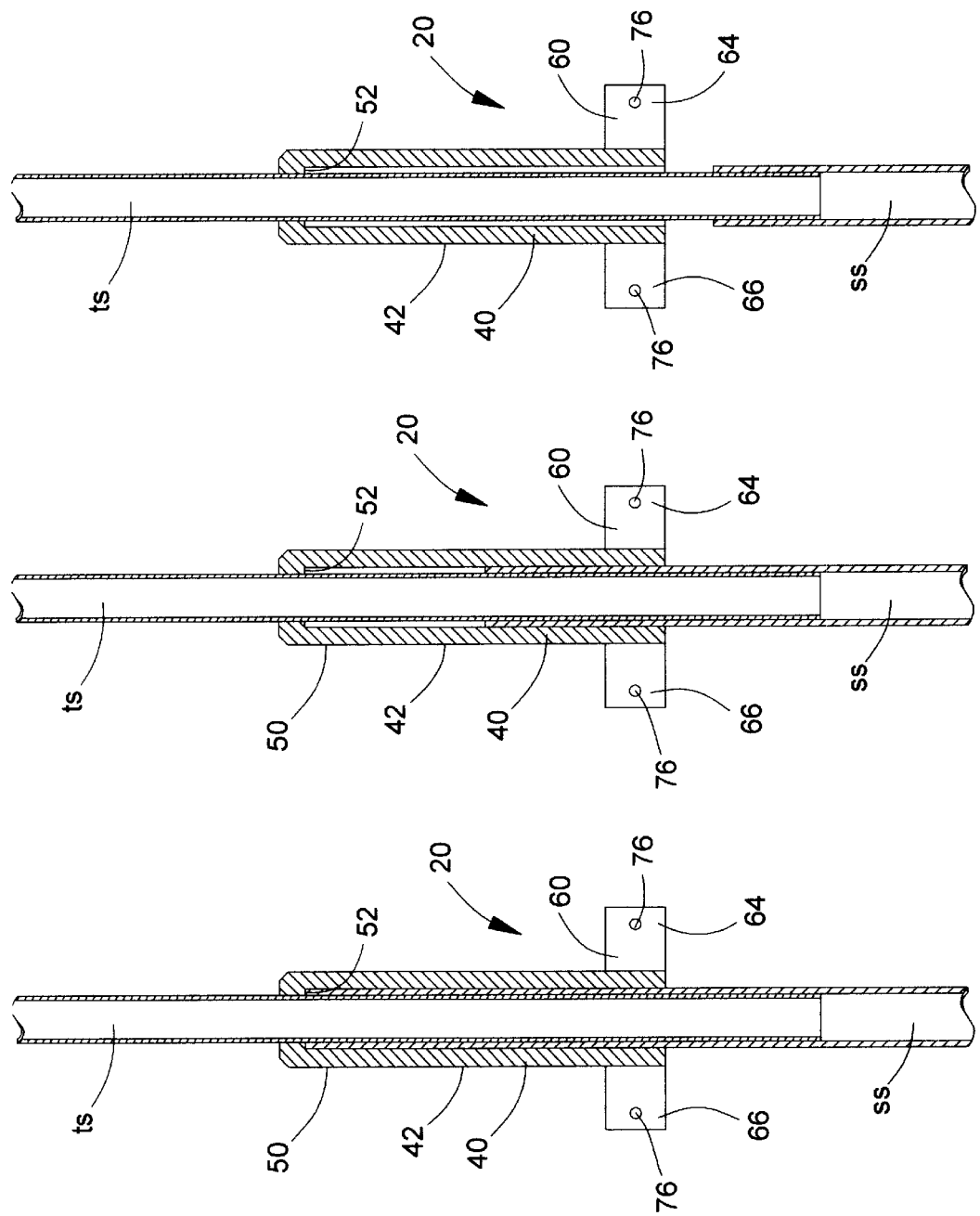

ACCESSORY MOUNT FOR AN EXTENDABLE SHAFT

TECHNICAL FIELD

The invention relates to the field of accessory mounts. More particularly, the invention relates to a device for removably attaching accessories to an extendable shaft, such as the shaft of a music stand.

BACKGROUND OF THE INVENTION

Music stands have been used for years by musicians, conductors, students and others to support sheet music during lessons, practice and performance. The desk of the music stand is also often used to hold writing implements, batons, instrument parts and the like, although most music stands are not designed to accommodate such accessories. The presence of accessories on the music desk impedes the turning of pages, upsets the balance of the music stand, and generally clutters the desk surface. An alternative is to place the various accessories on the floor or on a nearby chair. However, such action increases the risk of damaging or losing the accessories.

As a result of the need for a safe place to store accessories within reach of a user of a music stand, several attempts have been made to provide storage devices for attachment to a music stand. For example, U.S. Pat. No. 4,300,743 to Morris (1981) provides a music stand tray accessory that is removably attachable to the lip of a music desk. U.S. Pat. No. 5,488,890 to Biasini (1996) provides a string instrument holder for suspending a stringed instrument from the lip of a music desk. Others have provided accessory holders that attach to the shaft of the music stand. For example, U.S. Pat. No. 4,611,722 to Teig (1986) discloses a mute holder that is removably attachable to the shaft of a music stand using a pair of friction clips. U.S. Pat. No. Des. 276,779 to Gomez (1984) discloses an ornamental design for a music stand accessory tray. The accessory tray of the '779 patent is secured to the shaft of a music stand with a clamp.

Despite the improvements provided by the above noted patents, a need remains for an accessory mount for a music stand. In particular, a need exists for an accessory mount that can be engaged and removed quickly, easily, and with a minimum of adjustments. An additional need exists for an accessory mount that attaches to a music stand in a way that does not upset the balance of the music stand. Another need exists for an accessory mount for a music stand that will not slide down the shaft of the music stand when downward force is applied to the accessory. Furthermore, a need exists for an accessory mount for a music stand that does not scratch, crush, or otherwise damage the music stand. Furthermore, a need exists for an accessory mount for a music stand that can be used in combination with a variety of accessories.

SUMMARY OF INVENTION

The invention is an accessory mount for removably securing an accessory to an extendable shaft, where the extendable shaft includes a stationary shaft and a telescoping shaft. The accessory mount includes a sleeve having an interior surface with an interior diameter and an upper edge. A collar is provided proximate the upper edge of the interior surface. The diameter of the collar is less than the interior diameter of the sleeve. The collar includes a lip for supporting the accessory mount on the stationary shaft of the extendable shaft. A longitudinal opening is provided in the sleeve, and an accessory attachment point is provided on the sleeve for receiving the accessory.

In an embodiment, the interior surface of the sleeve is sized to closely fit the stationary shaft of the extendable shaft.

In an additional embodiment, the collar is sized to closely fit the telescoping shaft of the extendable shaft.

In a further embodiment, the accessory attachment point is a substantially rectangular cross member that is substantially perpendicular to the longitudinal axis of the sleeve.

In another embodiment, the accessory attachment point is a ledge extending perpendicularly from the sleeve.

In an additional embodiment, the accessory mount further includes an accessory, such as a string instrument holder, mute holder, or accessory tray attached to the attachment point of the accessory mount.

The invention provides an accessory mount that is quickly and easily installed on an extendable shaft, such as the shaft of a music stand. The accessory mount can be installed without tools or adjustments, and will not slide down the extendable shaft. Additionally, the accessory mount will not mar the extendable shaft on which it is installed. An additional benefit of the accessory mount of the present invention is that it can be used to secure a variety of accessories to an extendable shaft.

These and other features and advantages will become apparent by considering the detailed description and drawings that follow.

BRIEF DESCRIPTION OF DRAWINGS

FIG. 1 is an isometric view of an embodiment of the accessory mount of the present invention;

FIG. 2 is a cut away isometric view of an embodiment of the accessory mount of the present invention;

FIG. 3 is cut away isometric view of an embodiment of the accessory mount of the present invention;

FIG. 6A is a plan view of an embodiment of the accessory mount of the present invention;

FIG. 6B is a side elevation view of an embodiment of the accessory mount of the present invention;

FIG. 6C is a side elevation view of an, embodiment of the accessory mount of the present invention;

FIG. 6D is a side elevation view of an embodiment of the accessory mount of the present invention;

FIG. 6E is a bottom view of an embodiment of the accessory mount of the present invention;

FIG. 14A is a plan view of an embodiment of the accessory mount of the present invention;

FIG. 14B is a plan view of an embodiment of the accessory mount of the present invention;

FIG. 15A is a cut away isometric view of an embodiments of the accessory mount of the present invention;

FIG. 15B is an isometric view of an embodiment of the accessory mount of the present invention;

FIG. 15C is an isometric view of an embodiment of the accessory mount of the present invention;

FIG. 16A is a section view of an embodiment of the accessory mount of the present invention;

FIG. 16B is a section view of an embodiment of the accessory mount of the present invention; and FIG. 16C is a section view of an embodiment of the accessory mount of the present invention.

DETAILED DESCRIPTION OF SPECIFIC EMBODIMENTS

Figure 4:
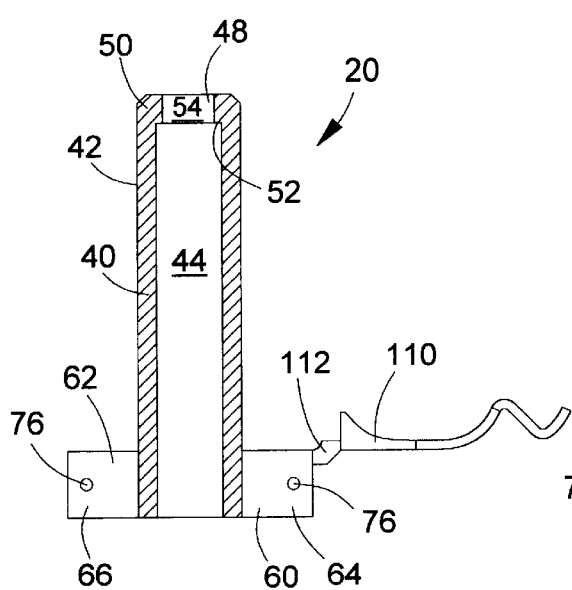
FIG. 4 is a section view of an embodiment of the accessory mount of the present invention.
Figure 5:
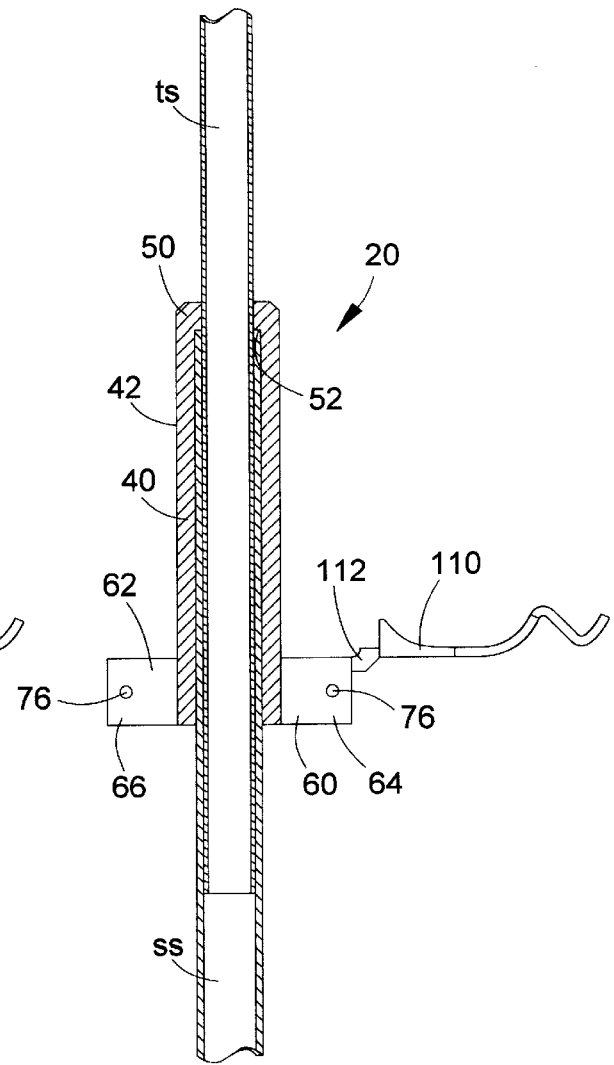
FIG. 5 is a section view of an embodiment of the accessory mount of the present invention.
Figure 7A:
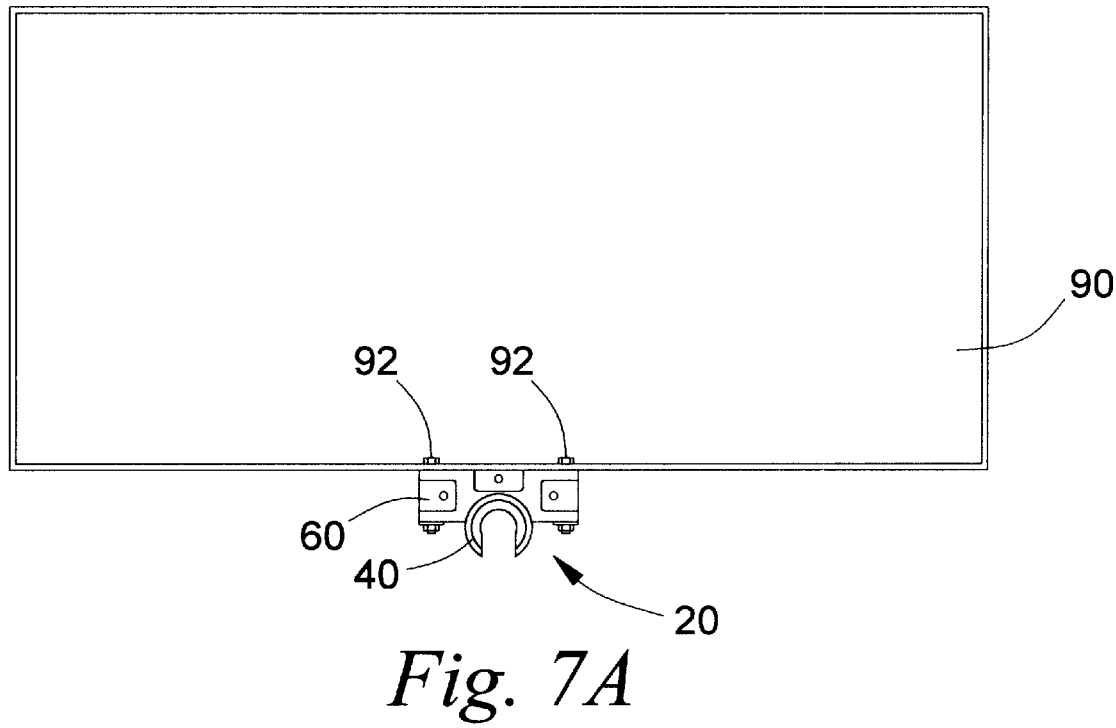
FIG. 7A is a plan view of an embodiment of the accessory mount of the present invention.
Figure 7B:
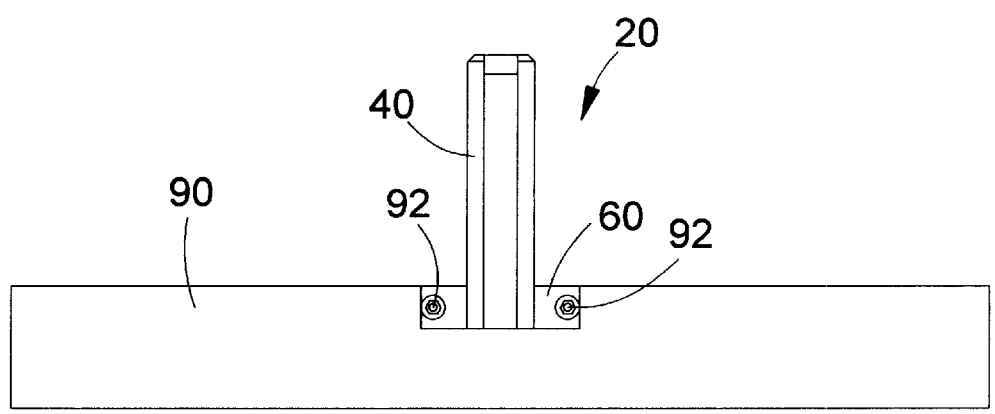
FIG. 7B is a side elevation view of an embodiment of the accessory mount of the present invention.
Figure 8A:
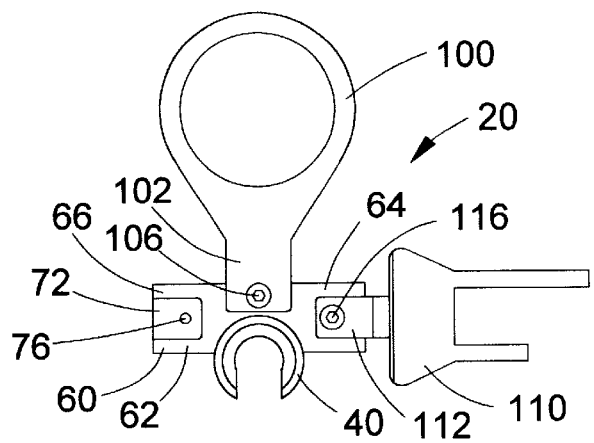
FIG. 8A is a plan view of an embodiment of the accessory mount of the present invention.
Figure 8B:
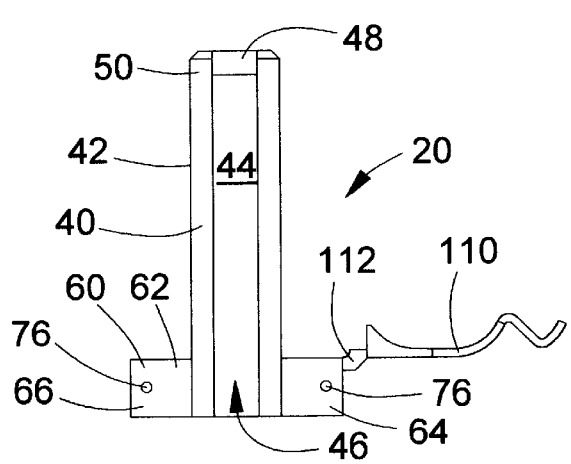
FIG. 8B is a side elevation view of an embodiment of the accessory mount of the present invention.
Figure 8C:
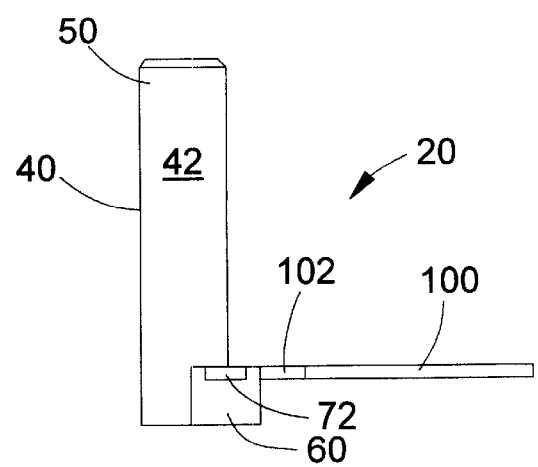
FIG. 8C is a side elevation view of an embodiment of the accessory mount of the present invention.
Figure 8D:
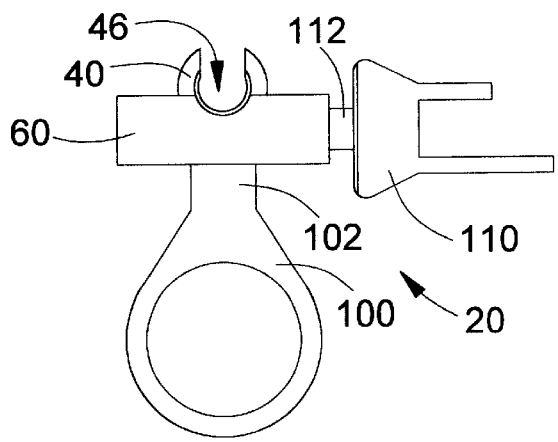
FIG. 8D is a bottom view of an embodiment of the accessory mount of the present invention.

An accessory mount 20 is disclosed in the following description and drawings. The accessory mount includes a sleeve 40 and an accessory attachment point 60. The accessory mount may further include accessories secured to the accessory attachment point, as will be described below. The accessory mount is used to removably secure one or more accessories to an extendable shaft, such as the shaft of a music stand. Music stands typically have a shaft comprising a stationary shaft ss, and a telescoping shaft ts having a diameter smaller than the stationary shaft. The telescoping shaft is slidably receivable in the stationary shaft, and extends upwardly therefrom. The accessory mount of the present invention will be described in terms of its attachment to the shaft of a music stand, although the invention is not limited to use with a music stand.

As shown in FIG. 1, the sleeve 40 of the accessory mount 20 has an exterior surface 42 and an interior surface 44. The interior surface of the sleeve has an interior diameter sized to closely fit the stationary shaft ss of a music stand to which the accessory mount will be attached, as shown in FIGS. 4, 5, 16B and 16C. A longitudinal opening 46 is provided along the length of the sleeve. The longitudinal opening has a width w substantially equal to the diameter of the telescoping shaft ts of the music stand to which the accessory mount will be attached. The width w of the longitudinal opening is less than the diameter of the stationary shaft ss. Preferably, the interior surface of the sleeve is substantially cylindrical in shape to most closely fit a music stand shaft. However, it is also possible to employ other interior surface shapes, as long as the sleeve fits onto the music stand shaft with relatively little play between the sleeve and the shaft.

The sleeve 40 further includes a collar 48 proximate the upper edge 50 of the interior surface 44 of the sleeve, as best seen in FIGS. 1 and 2. The collar essentially comprises a necked down portion of the interior surface of the sleeve. The collar has a collar diameter, which is less than the sleeve interior diameter. The collar includes a lip 52 and a collar surface 54. The lip is a ridge formed by the difference in diameter between the collar and the interior surface of the sleeve. When the accessory mount is installed on the music stand shaft, the lip rests on the top of the stationary shaft, preventing the downward movement of the accessory mount. The collar surface is sized to closely fit the telescoping shaft ts of the music stand, as seen in FIGS. 16B and 16C.

The accessory attachment point 60 mount 20 is affixed to or integral with the sleeve 40. Preferably, the accessory attachment point is positioned on the exterior surface 42 of the sleeve, substantially opposite the longitudinal opening 46 in the sleeve. The accessory attachment point provides an attachment point for one or more accessories to be used with the accessory mount. The attached drawings show a few possible configurations of the accessory attachment point of the present invention. However, the invention is not limited to the specific accessory attachment point shapes shown and described.

In the embodiment shown in FIGS. 1 through 12 and 15A through 16C, the accessory attachment point 60 has a cross member 62 that is substantially perpendicular to the longitudinal axis of the sleeve 40. The cross member preferably has a rectangular configuration, with a first cross member end 64 and a second cross member end 66 extending perpendicularly from the sleeve. A substantially horizontal upper surface 68 of the cross member is adapted to receive a variety of accessories. Preferably, a plurality of grooves are provided in the upper surface. The grooves serve as an attachment device for securing the tongue of an accessory to the accessory mount. In the preferred embodiment detailed in FIG. 6A, a first groove 70 is positioned on the upper surface on the first cross member end, opening in the direction of the first cross member end. A second groove 72 is positioned on the upper surface of the cross member on the second cross member end, opening in the direction of the second cross member end. A third groove 74 is centered on the upper surface of the cross member, opening away from the sleeve. The three grooves can be identical in size and shape to interchangeably receive accessories. Alternatively, the three grooves can have different sizes and shapes to accommodate specific accessories.

With continuing reference to the embodiment shown in FIGS. 1 through 12, the cross member 62 can additionally include one or more perforations 76 for receiving bolts, screws, rivets or the like. Preferably, a perforation is provided in the first groove 70, the second groove 72 and the third groove 74. Perforations are also provided horizontally through the first cross member end 64 and the second cross member end 66 of the cross member, as shown in FIGS. 6B and 6C.

In the alternative embodiment shown in FIGS. 13A through 14B, the accessory attachment point is a ledge 80 extending perpendicularly from the exterior surface 42 of the sleeve 40. The ledge has a surface on which a variety of attachment devices can be employed to secure one or more accessories to the accessory mount. The ledge shown in the drawings is curved, although other ledge shapes are also contemplated and considered to be within the scope of the invention.

Any suitable attachment device, can be employed to secure an accessory to the accessory mount 20. Examples of possible attachment devices include: hardware such as bolts, screws, pins, studs and rivets; adhesives and welds; friction; interlocking pieces; and other commonly known attachment devices. Furthermore, an accessory may be permanently affixed to the accessory mount, or formed integrally therewith.

The accessory mount 20 is adaptable to receive a variety of accessories, some of, which are shown in the drawings. In FIGS. 7A, 7B, 11 and 12, the accessory is a tray 90 attached to the accessory mount. In this embodiment, bolts 92 secure the tray to the accessory attachment point 60.

As shown in FIGS. 14A and 14B, a mute holder 100 can be the accessory attached to the accessory mount 20. In this embodiment, the accessory attachment point 60 is a ledge 80 as described above. The mute holder has a first tongue 102 sized to be received in the first groove 104 provided in the ledge. The tongue and groove arrangement helps to position the mute holder and prevent pivoting movement of the mute holder with respect to the accessory mount. In this embodiment, a set screw 106 is the attachment means provided to secure the mute holder to the ledge.

The accessory mount 20 can be adapted to receive more than one accessory. As shown in FIGS. 8A, 9, 10, 13A through 13E, and 15A through 16E, a mute holder 100 is attached to the accessory attachment point 60 of the accessory mount by securing the tongue 102 of the mute holder in the groove 72 of the accessory attachment point. Additionally, a second accessory, such as a string instrument holder 110, is attached to the accessory attachment point. The tongue 112 of the string instrument holder is received in the groove 70 provided in the accessory attachment point. As with the mute holder, the tongue and groove arrangement helps to position the string instrument holder and prevent pivoting movement thereof with respect to the accessory mount. In this embodiment, a set screw 114 is the attachment device provided to secure the string instrument holder to the accessory attachment point.

In addition to the accessories described above and illustrated in the accompanying drawings, various other accessories can be used with the accessory mount 20 of the present invention. Those accessories can include, instrument holders, cup holders, music holders, microphone holders, accessory boxes, etc. Virtually any accessory capable of being secured to the accessory mount can be used.

Figure 11:
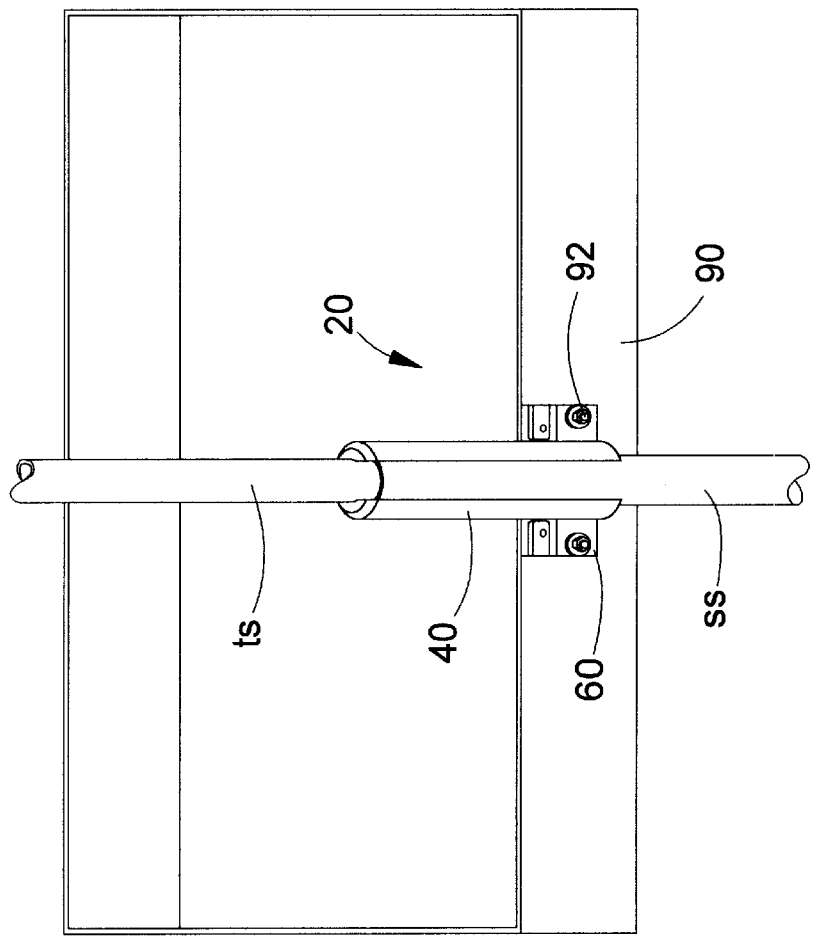
FIG. 11 is an isometric view of an embodiment of the accessory mount of the present invention.
Figure 9:
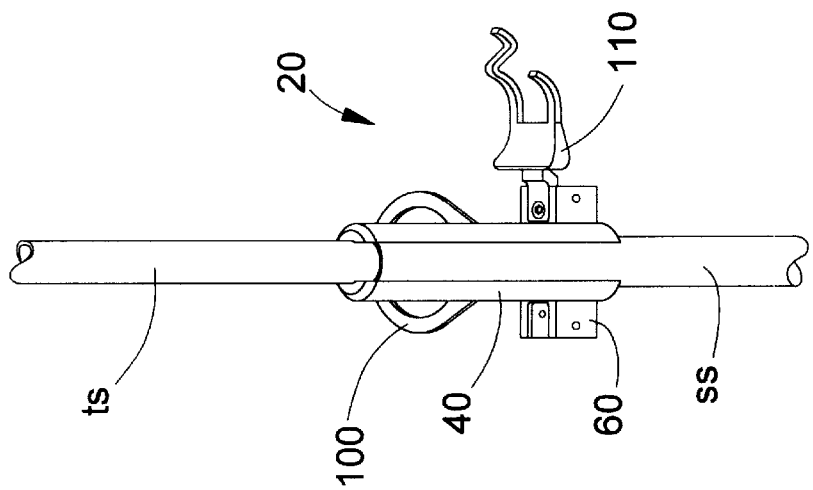
FIG. 9 is an isometric view of an embodiment of the accessory mount of the present invention.
Figure 10:
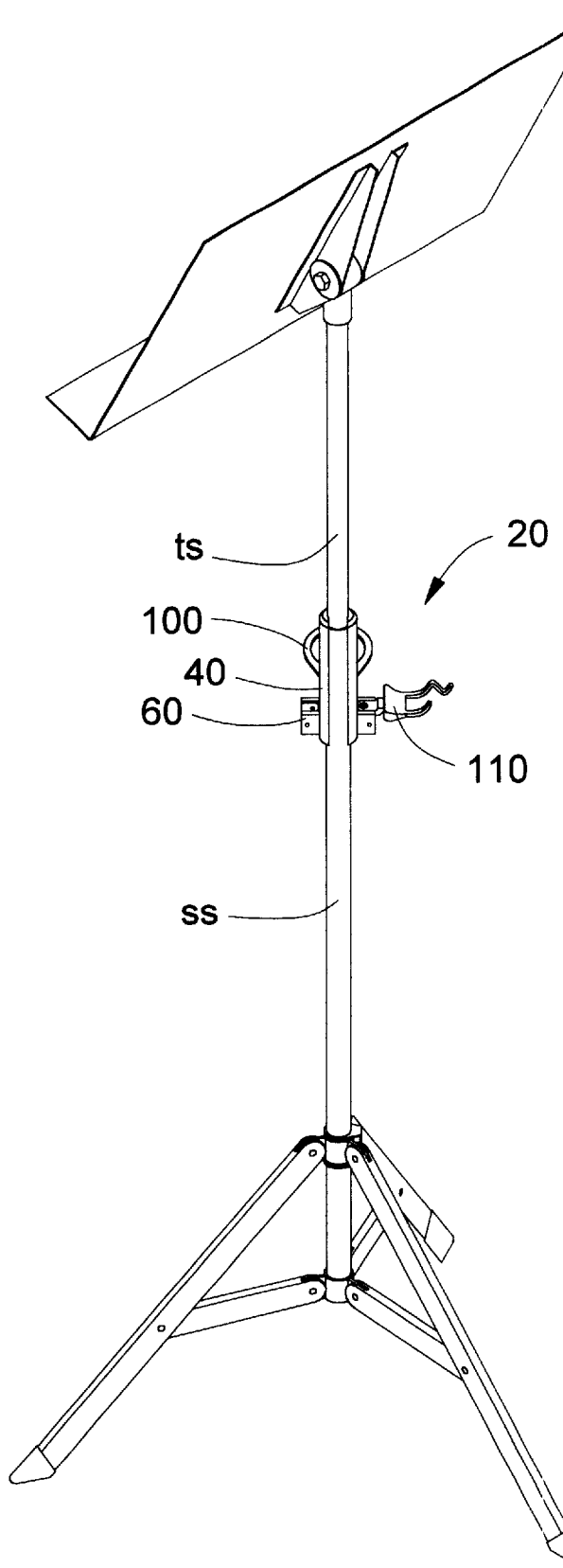
FIG. 10 is an isometric view of an embodiment of the accessory mount of the present invention.
Figure 12:
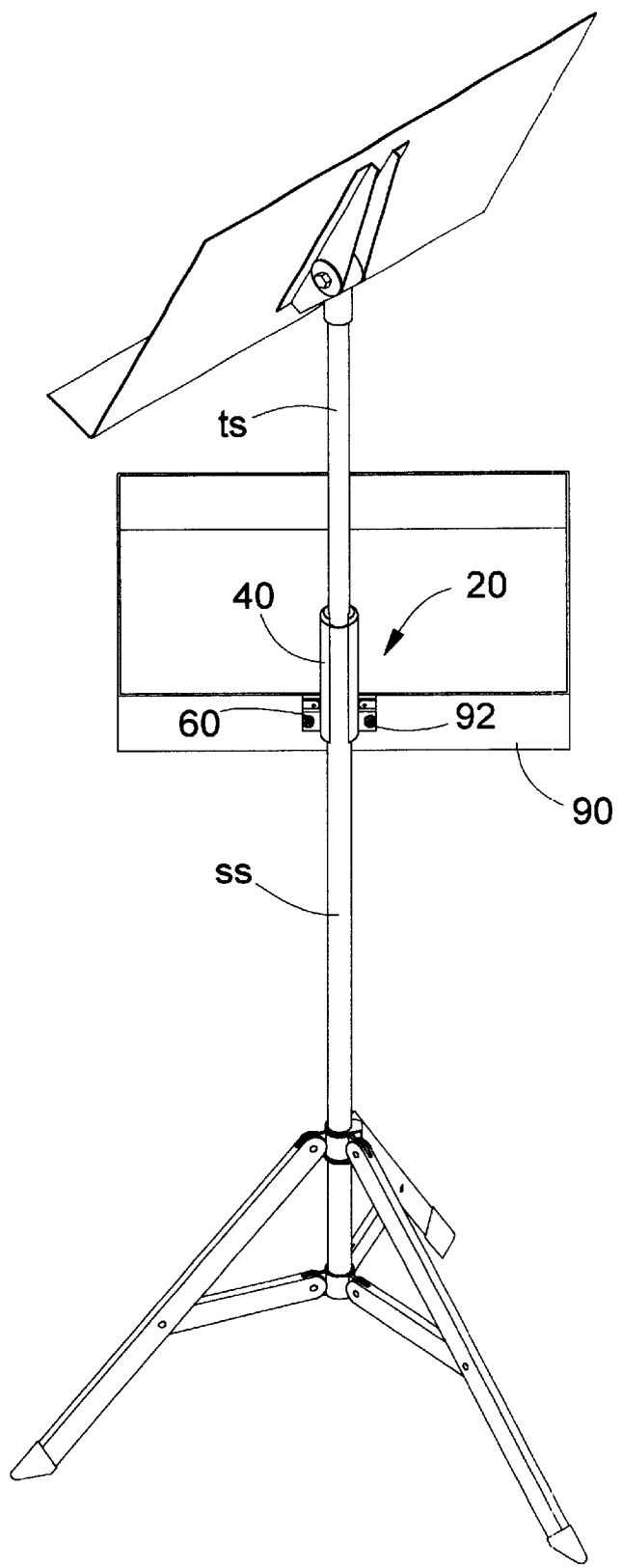
FIG. 12 is an isometric view of an embodiment of the accessory mount of the present invention.
Figure 13A:
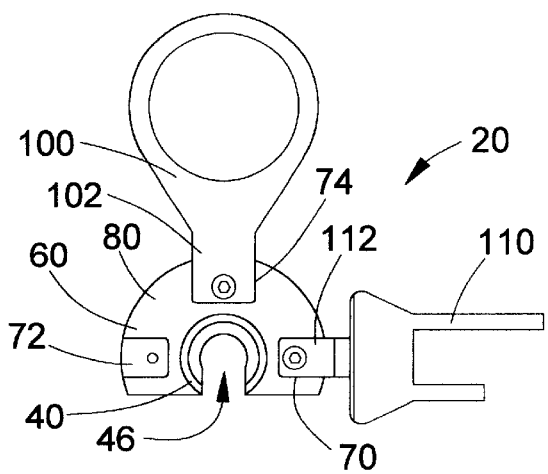
FIG. 13A is a plan view of an embodiment of the accessory mount of the present invention.
Figure 13B:
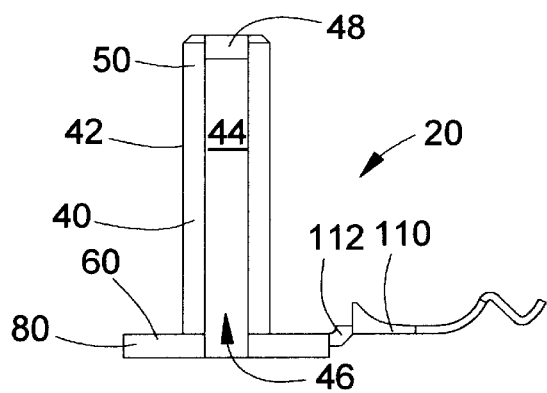
FIG. 13B is a side elevation view of an embodiment of the accessory mount of the present invention.
Figure 13C:
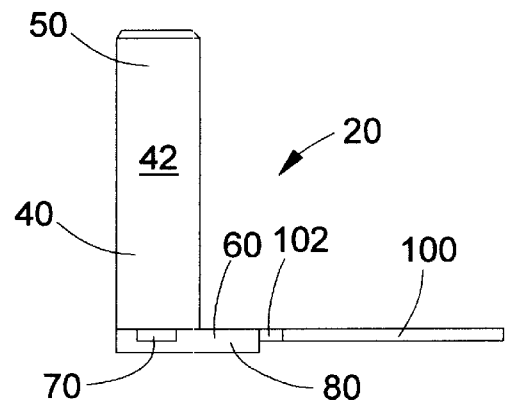
FIG. 13C is a side elevation view of an embodiment of the accessory mount of the present invention.
Figure 13D:
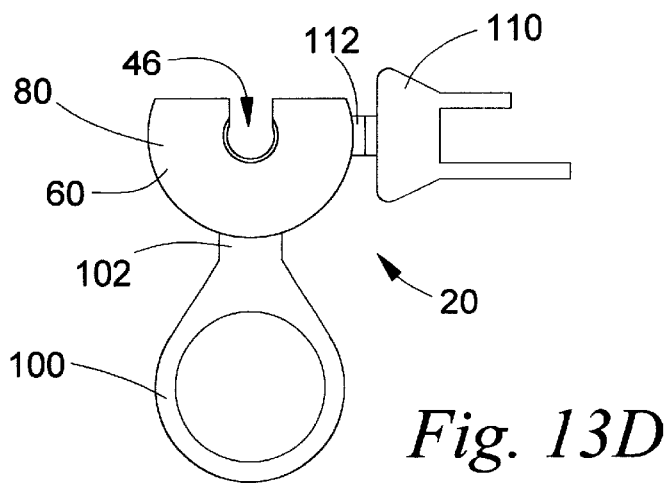
FIG. 13D is a bottom view of an embodiment of the accessory mount of the present invention.
Figure 13E:
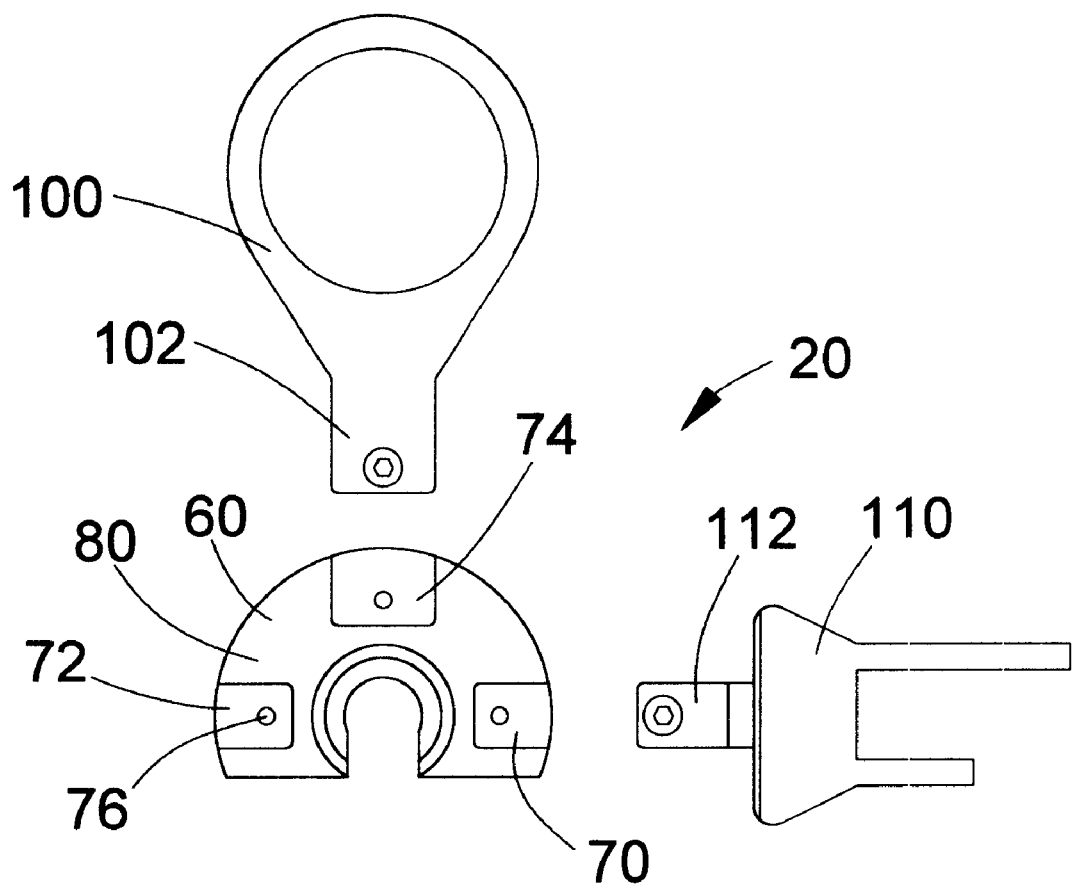
FIG. 13E is a plan view of an embodiment of the accessory mount of the present invention.

Preferably, the accessory attachment point 60 is adapted to receive one or more interchangeable accessories. In such an embodiment, each of the accessories has an identical attachment configuration, so that a single accessory mount 20 may be used to support a variety of accessories as the need arises. For example, FIGS. 9 and 10 show the accessory mount used to secure a mute holder 100 and a string instrument holder 110 to a music stand shaft. The same accessory mount is shown in FIGS. 11 and 12, with the mute holder and string instrument holder removed and an accessory tray 90 attached. To make the interchanging of accessories as simple as possible, the accessories can be attached to the accessory attachment point using a tongue-and-groove system, a pin, ;a stud, or another attachment device that does not require the use of tools.

The accessory mount 20 of the present invention is preferably formed of a nonresilient material. Alternatively, a slightly resilient material may be used. Injection molded nylon or Nylatron™ has been used successfully.

In use, the accessory mount 20 is quickly and easily installed on the shaft of a music stand. First, the longitudinal opening 46 of the sleeve 40 is aligned with the telescoping shaft ts of the music stand. The accessory mount is then pressed on to the telescoping shaft by gently forcing the telescoping shaft into the longitudinal opening. Next, the accessory mount is slid downward so that the interior surface 44 of the sleeve is positioned snugly over the stationary shaft ss of the music stand. The downward movement of the accessory mount is checked by the collar 48 provided in the sleeve of the accessory mount. Because the interior diameter of the collar is less than the diameter of the stationary shaft, the lip 52 of the collar will not slide past the top of the stationary shaft. The accessory mount is suspended on the stationary shaft. Additionally, because the longitudinal opening has a width only as wide as the diameter of the telescoping shaft, i.e., narrower than the width of stationary shaft, the accessory mount cannot be pulled off of the stationary shaft.

To remove the accessory mount 20 from the music stand, the accessory mount must first be slid up on the music stand so that the longitudinal opening 46 in the sleeve 42 is aligned with the telescoping shaft ts of the music stand. The accessory mount can then removed by pulling the sleeve away from the telescoping, shaft.

In compliance with the statutes, the invention has been described in language more or less specific as to structural features and process steps. While this invention can be embodied in different forms, the specification describes and illustrates preferred embodiments of the invention. It will be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims, as appropriately interpreted in accordance with the doctrine of equivalents.

What is claimed is:

1. An accessory mount, the accessory mount for removably securing an accessory to an extendable shaft, the extendable shaft including a stationary shaft and a telescoping shaft, the accessory mount comprising:

a sleeve, the sleeve including:

an interior surface having an interior diameter and an upper edge;

a collar proximate the upper edge of the interior surface, the collar having a collar diameter less than the interior diameter, and the collar including a lip for supporting the accessory mount on the stationary shaft of the extendable shaft;

a longitudinal opening extending the length of the sleeve; and an accessory attachment point for receiving the accessory, the accessory attachment point comprising a substantially rectangular cross member, the cross member being substantially perpendicular to the longitudinal axis of the sleeve.

2. The accessory mount of claim 1, wherein the interior surface of the sleeve is adapted to be sized to closely fit the stationary shaft of the extendable shaft.

3. The accessory mount of claim 1, wherein the collar is adapted to be sized to closely fit the telescoping shaft of the extendable shaft.

4. The accessory mount of claim 1, the cross member including an attachment device for securing an accessory to the accessory mount.

5. The accessory mount of claim 4, wherein the cross member includes a substantially horizontal upper surface, and the attachment device is a groove provided in the upper surface for receiving an accessory.

6. The accessory mount of claim 1, further including a perforation for receiving an attachment device.

7. An accessory mount, the accessory mount for removably securing an accessory to an extendable shaft, the extendable shaft including a stationary shaft and a telescoping shaft, the accessory mount comprising:
 a sleeve, the sleeve including:
  an interior surface having an interior diameter and an upper edge;
  a collar proximate the upper edge of the interior surface, the collar having a collar diameter less than the interior diameter, and the collar including a lip for supporting the accessory mount on the stationary shaft of the extendable shaft;
  a longitudinal opening extending the length of the sleeve; and
 an accessory attachment point for receiving the accessory, the accessory attachment point comprising a ledge extending perpendicularly from the sleeve of the accessory mount, the ledge having at least one groove formed in its upper surface.

8. An accessory mount, the accessory mount for removably securing an accessory to an extendable shaft, the extendable shaft including a stationary shaft and a telescoping shaft, the accessory mount comprising:
 a sleeve, the sleeve including:
  an interior surface having an interior diameter and an upper edge;
  a collar proximate the upper edge of the interior surface, the collar having a collar diameter less than the interior diameter, and the collar including a lip for supporting the accessory mount on the stationary shaft of the extendable shaft;
  a longitudinal opening extending the length of the sleeve; and
 an accessory attachment point for receiving the accessory, the accessory attachment point comprising a ledge extending perpendicularly from the sleeve of the accessory mount, the ledge including a perforation for receiving an attachment device.

9. An accessory mount, the accessory mount removably securable on an extendable shaft, the extendable shaft including a stationary shaft and a telescoping shaft, the accessory mount comprising:
 a sleeve, the sleeve including:
  an interior surface having an interior diameter and an upper edge;
  a collar proximate the upper edge of the interior surface, the collar having a collar diameter less than the interior diameter, and the collar including a lip for supporting the accessory mount on the stationary shaft of the extendable shaft;
  a longitudinal opening extending the length of the sleeve;
 an accessory attachment point on the sleeve; and
 a string instrument holder secured to the accessory attachment point.

10. An accessory mount, the accessory mount removably securable on an extendable shaft, the extendable shaft including a stationary shaft and a telescoping shaft, the accessory mount comprising:
 a sleeve, the sleeve including:
  an interior surface having an interior diameter and an upper edge;
  a collar proximate the upper edge of the interior surface, the collar having a collar diameter less than the interior diameter, and the collar including a lip for supporting the accessory mount on the stationary shaft of the extendable shaft;
  a longitudinal opening extending the length of the sleeve;
 an accessory attachment point on the sleeve; and
 a mute holder secured to the accessory attachment point.

11. An accessory mount, the accessory mount removably securable on an extendable shaft, the extendable shaft including a stationary shaft and a telescoping shaft, where the telescoping shaft has a diameter less than the diameter of the stationary shaft, and the telescoping shaft is slidably received in the stationary shaft, the accessory mount comprising:
 a sleeve, the sleeve including: an upper edge; an interior surface having a substantially continuous interior diameter along the length of the sleeve, the interior diameter selected to closely fit the stationary shaft; a collar proximate the upper edge of the interior surface, the collar having a collar diameter less than the interior diameter, and the collar including a lip for supporting the accessory mount on the stationary shaft;
 a longitudinal opening extending the length of the sleeve, the longitudinal opening having a width equal to or greater than the diameter of the telescoping shaft, and less than the diameter of the stationary shaft;
 an accessory attachment point on the sleeve; and
 an accessory secured to the accessory attachment point.

12. The accessory mount of claim 11, wherein the accessory is a string instrument holder.

13. The accessory mount of claim 11, wherein the accessory is a mute holder.

14. The accessory mount of claim 11, wherein the accessory is an accessory tray.

* * * * *